(12) United States Patent
Adkins

(10) Patent No.: US 9,125,516 B2
(45) Date of Patent: Sep. 8, 2015

(54) FIRE PIT BURNER

(75) Inventor: Michael Scott Adkins, Vandalia, OH (US)

(73) Assignee: HEARTH PRODUCTS CONTROLS CO., Kettering, OH (US)

( * ) Notice: Subject to any disclaimer, the term of this patent is extended or adjusted under 35 U.S.C. 154(b) by 427 days.

(21) Appl. No.: 13/618,236

(22) Filed: Sep. 14, 2012

(65) Prior Publication Data

US 2014/0076302 A1    Mar. 20, 2014

(51) Int. Cl.
  *A47J 37/07* (2006.01)
  *F23D 14/10* (2006.01)
  *F24C 3/08* (2006.01)

(52) U.S. Cl.
  CPC ............. *A47J 37/0713* (2013.01); *F23D 14/10* (2013.01); *F24C 3/08* (2013.01)

(58) Field of Classification Search
  CPC ......... F23D 14/06; F23D 14/10; F23D 14/08; F24C 3/08; F24C 3/087; F23N 2037/02; A47J 37/0713; A47J 37/0763; A47J 37/0781
  See application file for complete search history.

(56) References Cited

U.S. PATENT DOCUMENTS 1,625,623 A * 4/1927 O'Dowd ..................... 126/39 E

* cited by examiner

*Primary Examiner* — Alfred Basichas
(74) *Attorney, Agent, or Firm* — Thompson Hine LLP

(57) ABSTRACT

A fire pit burner having an inlet hub adapted to be fluidly connected to a fuel source, a fuel supply spoke, and a burner tube. The fuel supply spoke is fluidly connected to the inlet hub at a first end and the burner tube at a second end at such an angle that the elevation of the first end is above the second end. Additionally, the fuel supply spoke and the burner tube each have a plurality of top and side holes in order to distribute the fuel and flames.

30 Claims, 3 Drawing Sheets

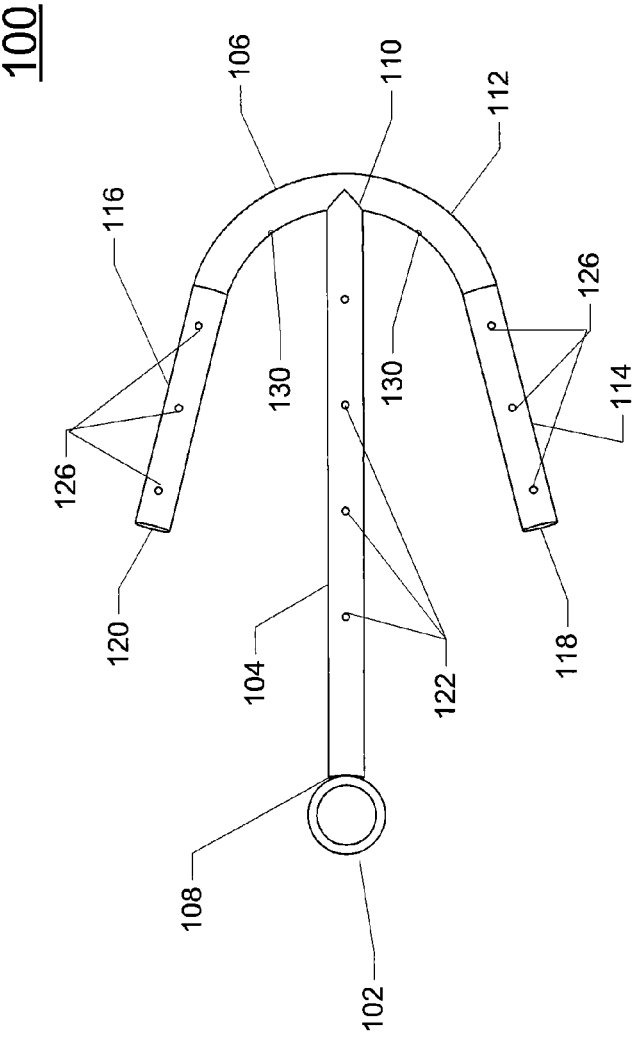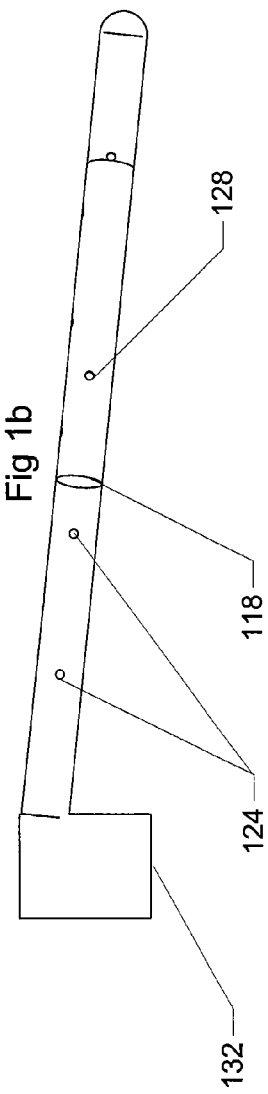

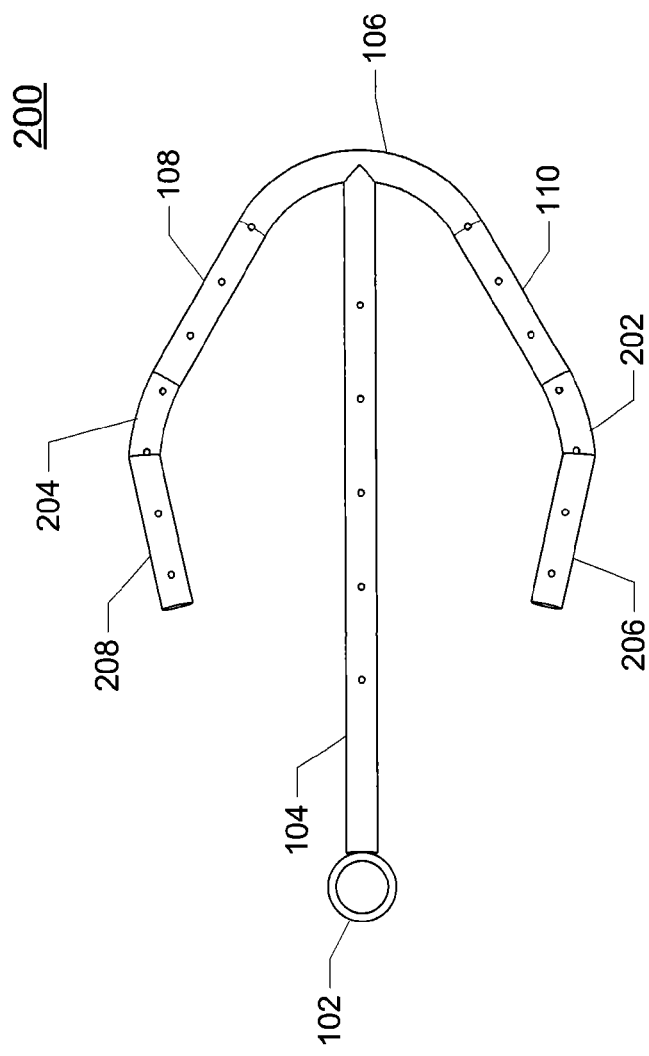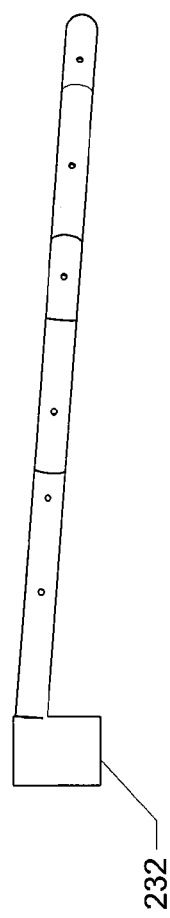
Fig 2a
Fig 2b

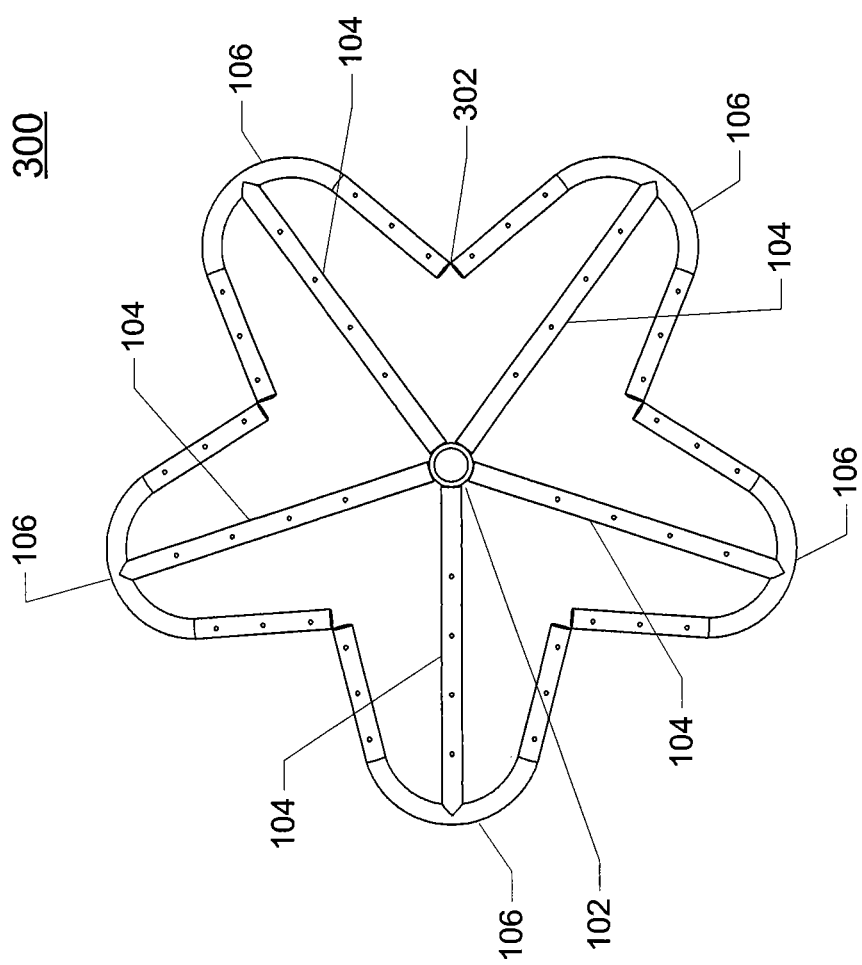

FIRE PIT BURNER

TECHNICAL FIELD

The present invention relates to fire effect systems and, in particular, to fire pit burners.

SUMMARY

According to a first aspect, the fire pit burner includes an inlet hub adapted to be fluidly connected to a fuel source, a fuel supply spoke with a first end and a second end, wherein the first end is fluidly connected to the inlet hub, and wherein the second end is below the elevation of the first end, a burner tube with a curved portion, a first straight portion, a second straight portion, a first end, and a second end, wherein the curved portion is fluidly connected to the second end of the fuel supply spoke, and wherein the first end and the second end are each mechanically sealed, the fuel supply spoke may include a plurality of top side spoke holes located on its top surface, a plurality of side spoke holes located on the left and right surfaces of the fuel supply spoke, a plurality of top side burner holes located on the top surfaces of the first straight portion and the second straight portion of the burner tube, a plurality of side burner holes located on the left and right surfaces of the first straight portion and the second straight portion of the burner tube, and a plurality of radial holes located on the inside radius of the curved portion of the burner tube.

According to a second aspect, the fire pit burner includes an inlet hub adapted to be fluidly connected to a fuel source, a first and second fuel supply spoke each with a first end and a second end, wherein the first end of each is fluidly connected to the inlet hub, and wherein the second end of each is below the elevation of each first end, a first burner tube having a curved portion, a first straight portion, a second straight portion, a first end, and a second end, wherein the curved portion is fluidly connected to said second end of the first fuel supply spoke, a second burner tube with a curved portion, a first straight portion, a second straight portion, a first end, and a second end, wherein the curved portion is fluidly connected to the second end of the second fuel supply spoke, the first and second fuel supply spokes may include a plurality of top side spoke holes located on their top surfaces, a plurality of side spoke holes located on the left and right surfaces of the first and second fuel supply spokes, a plurality of top side burner holes located on the top surfaces of the first straight portions and the second straight portions of the first and second burner tubes, a plurality of side burner holes located on the left and right surfaces of the first straight portions and the second straight portions of the first and second burner tubes, and a plurality of radial holes located on the inside radiuses of the curved portions of the first and second burner tubes.

BRIEF SUMMARY OF THE FIGURES

FIG. 1a depicts a top view of one embodiment of a fire pit burner.

FIG. 1b depicts a side view of the embodiment in FIG. 1a.

FIG. 2a depicts a top view of a second embodiment of a fire pit burner.

FIG. 2b depicts a side view of the embodiment in FIG. 2b.

FIG. 3 depicts an embodiment of a multiple fire pit burner configuration.

DETAILED DESCRIPTION

Referring to FIGS. 1a and 1b, a first embodiment of a fire pit burner 100 is shown. The fire pit burner 100 includes an inlet hub 102, a fuel supply spoke 104, and a burner tube 106. The combination of the a fuel supply spoke 104 and the burner tube 106 may also be referred to as a burner leg 134. All components of fire pit burner 100 may be made out of stainless steel, or any other material known in the art used in the making of burner tubes. The inlet hub 102 is adapted to be fluidly connected to a fuel source (not shown). For example, the inlet hub 102 may include an internally threaded opening 132 for connection to a fuel source. The fluid connection between the inlet hub 102 and the fuel source may also be achieved through any other means known in the art. The fuel supply spoke 104 has a first end 108 and a second end 110. The burner tube 106 has a first end 118 and a second end 120, and may include a curved portion 112, a first straight portion 114, and a second straight portion 116. The first end 108 of the fuel supply spoke 104 is fluidly connected to the inlet hub 102 at an angle such that the elevation of the first end 108 is above the elevation of the second end 110 (as shown in FIG. 1b). The second end 110 of the fuel supply spoke 104 is fluidly connected to the burner tube 106. According to the embodiment shown in FIG. 1a, the second end 110 of the fuel supply spoke 104 is fluidly connected to the curved portion 112 of the burner tube 106. Connections between the inlet hub 102, the fuel supply spoke 104, and the burner tube 106 may be achieved by welding or any other means known in the art. The first end 118 and the second end 120 of the burner tube 106 are mechanically sealed by welding or any other means known in the art. In another embodiment, first end 118 and the second end 120 of the burner tube 106 are fluidly connected to adjacent ends of adjacent burner tubes 106.

As depicted in FIG. 1b, the elevation of the first end 118 and the second end 120 of the burner tube 106 may be above the elevation of the curved portion 112 and the second end 110 of the fuel supply spoke 104. Additionally, the angles of the fuel supply spoke 104 and the burner tube 106 may be substantially parallel and sloping away from the inlet hub 102 to aid in draining water or moisture away from the inlet hub 102. In one embodiment the slope of the fuel supply spoke 104 is gradual so as to maintain a low profile of no more than about 1.5 inches between the top of the inlet hub 102 and the bottom of the burner tube 106 at its outermost perimeter.

In one preferred embodiment, the portions of the burner tube 106, including the first end 118 and the second end 120, are located approximately five inches from, but no more than about five inches from, fuel supply spoke 104. The tubing is designed and positioned so as to minimize void areas. Maximum void areas vary from three to five inches depending on the size and the intended BTU of the fire pit burner 100. This provides a uniformly distributed, natural-looking flame pattern. The portions of the fire pit burner 100 that emit flame, including the burner tube 106 and the fuel supply spoke 104, are kept close enough together so that the emitted flames do not appear merely as an unnatural looking outline and yet far enough apart so that the emitted flames do not merge together into a single flame (i.e., like a candlestick). Additionally, burner holes are arranged in a manner that work with the fuel supply spoke 104 and the burner tube 106 to emit a natural looking uniform flame where each individual burner hole is not noticed.

The fuel supply spoke 104 may include a plurality of top side spoke holes 122 located on its top surface. Fuel supply spoke 104 may also include a plurality of side spoke holes 124 located on both its left and right lateral surfaces. In one embodiment, the side spoke holes 124 are located at any angle between sixty (60) and one hundred twenty (120) degrees relative to the top side spoke holes 122. Preferably, the side spoke holes 124 and top side spoke holes 122 are separated by about ninety (90) degrees such that burner holes are located at the 9, 12, or 3 o'clock positions of the supply spoke 104 along its length. The burner tube 106 may include a plurality of top side burner holes 126 located on its top surface. Burner tube 106 may also include a plurality of side burner holes 128 located on both its left and right (or inner and outer) lateral surfaces. In one embodiment, the side burner holes 128 are located at any angle between sixty (60) and one hundred twenty (120) degrees relative to the top side burner holes 126. Preferably, the side burner holes 128 and top side burner holes 126 are separated by about ninety (90) degrees such that burner holes are located at the 9, 12, or 3 o'clock positions of the burner tube 106 along its length.

According to another embodiment, the first straight portion 114 and the second straight portion 116 of the burner tube 106 each include a plurality of top side burner holes 126 located on their top surfaces and a plurality of side burner holes 128 located on both their left and right (or inner and outer) lateral surfaces. In one embodiment, the side burner holes 128 are located at any angle between sixty (60) and one hundred twenty (120) degrees relative to the top side burner holes 126. Preferably, the side burner holes 128 and top side burner holes 126 are separated by about ninety (90) degrees. The curved portion 112 of burner tube 106, according to still another embodiment, may include a plurality of radial holes 130 located on its inside radius.

Preferably, the top and side burner holes on both the burner tube 106 and supply spoke 104 are spaced out along the length of tubes and are arranged in a substantially alternating pattern along the top and lateral sides so as to produce a uniformly distributed, aesthetically pleasing flame. In one embodiment the holes are no more than two inches apart and are positioned, alternately, at the 3, 12 and 9 o'clock positions along burner 100.

As shown and described herein, the shape and the direction of fuel flow through the fire pit burner 100 (i.e., from the hub, through a spoke to a perimeter, and back towards the hub) forces the fuel and flame to spread out more uniformly than other burner designs. In one embodiment, to promote a more uniform fuel and flame distribution pattern, the curved portion 112, the first straight portion 114, the second straight portion 116, the first end 118, and the second end 120 of the burner tube 106 are all located no more than five inches from the fuel supply spoke 104. The uniform fuel and flame distribution achieved by this design results in less media, such as artificial logs, lava, or other media known in the art for use with gas burners, being required to conceal the shape of the fire pit burner 100.

Referring to FIGS. 2a and 2b, a second embodiment of a fire pit burner 200 is shown. In this embodiment, fire pit burner 200 includes an inlet hub 102, a fuel supply spoke 104, and a burner tube 106. The inlet hub 102, fuel supply spoke 104, and burner tube 106 are the same and connected in the same manner as described above with the following exceptions. The burner tube 106 further includes a second curved portion 202, a third curved portion 204, a third straight portion 206, and a fourth straight portion 208. The top side burner holes 126 and the side burner holes 128 described above are extended and located on the second curved portion 202, a third curved portion 204, a third straight portion 206, and a fourth straight portion 208.

In a preferred version of this embodiment, to promote a more uniform fuel and flame distribution pattern, the curved portion 112, the second curved portion 202, the third curved portion 204, the first straight portion 114, the second straight portion 116, the third straight portion 206, the fourth straight portion 208, the first end 118, and the second end 120 of the burner tube 106 are all located approximately, and no more than, five inches from the fuel supply spoke 104.

Consistent with the described invention, any number of burner legs 134 may be connected to the inlet hub 102. The number of burner legs 134 is determined by the desired flame pattern and the user's needs. Referring to FIG. 3, an exemplary five leg fire pit burner configuration 300 is shown. When multiple burners are distributed about the inlet hub 102 each burner may be connected in the following manner. The second end 120 of the burner tube 106 of a burner is mechanically, not fluidly, connected to the first end 118 of the burner tube 106 of the adjacent burner to its right. The connection may be achieved by welding the ends together, or any other means known in the art for joining metal. In an embodiment, fuel does not pass from one adjacent burner to the next through the mechanically connected first and second ends, which remain sealed. In another embodiment, adjacent burner legs 134 are fluidly connected.

While various embodiments of the present disclosure have been described above, it should be understood that they have been presented by the way of example only, and not limitation. It will be understood by those skilled in the art that various changes in form and details may be made therein without departing from the spirit and scope of the disclosure as defined. Thus, the breadth and scope of the present disclosure should not be limited by any of the above-described exemplary embodiments.

What is claimed is:

1. A fire pit burner comprising:
   an inlet hub having an open end adapted to be fluidly connected to a fuel source;
   a plurality of fuel supply spokes having first and second ends, wherein said first ends are fluidly connected to said inlet hub; and
   a plurality of burner tubes each having a plurality of burner holes, a first end, and a second end, wherein each said burner tube is fluidly connected between its first and second ends to said second end of one of said fuel supply spokes;
   wherein said second end of each of said fuel supply spokes is below the elevation of the respective first end; and
   wherein said first and second ends of each of said burner tubes are each above the elevation of the point of fluid connection to the respective fuel supply spoke.

2. The fire pit burner of claim 1, wherein each said fuel supply spoke is sloped from the inlet hub to the respective burner tube, and each said burner tube is sloped from said first and second ends to the point of fluid connection to the respective fuel supply spoke, the slopes of the burner tube and respective fuel supply spoke being substantially parallel to each other.

3. The fire pit burner of claim 1, wherein said first and second ends of each said burner tube are each mechanically sealed.

4. The fire pit burner of claim 1, wherein each said fuel supply spoke includes a plurality of top side spoke holes and a plurality of side spoke holes that are substantially perpendicular to said top side spoke holes.

5. The fire pit burner of claim 1, wherein each said burner tube includes a plurality of top side burner holes and a plurality of side burner holes that are substantially perpendicular to said top side burner holes.

6. The fire pit burner of claim 1, wherein a radial distance between said first end of each said burner tube and said inlet hub is less than a radial distance between said second end of the respective fuel supply spoke and said inlet hub.

7. The fire pit burner of claim 1, wherein substantially all portions of each said burner tube are no more than five inches from the respective fuel supply spoke.

8. The fire pit burner of claim 1, wherein each said fuel supply spoke extends radially outward from the inlet hub and wherein each said burner tube curves radially inward from the point of fluid connection between the second end of the fuel supply spoke and the burner tube.

9. The fire pit burner of claim 1, wherein each said burner tube further comprises a first curved portion.

10. The fire pit burner of claim 9, wherein each said burner tube further comprises a second curved portion.

11. The fire pit burner of claim 10, wherein the radius of each said second curved portion is greater than the radius of the respective first curved portion.

12. A fire pit burner comprising:
an inlet hub having an open end adapted to be fluidly connected to a fuel source;
a first fuel supply spoke having a first end and a second end, wherein said first end is fluidly connected to said inlet hub, and wherein said second end is below the elevation of said first end;
a first burner tube having a first end and a second end, wherein said first burner tube is fluidly connected to said second end of said first fuel supply spoke;
a second fuel supply spoke having a first end and a second end, wherein said first end is fluidly connected to said inlet hub, and wherein said second end is below the elevation of said first end;
a second burner tube having a first end and a second end, wherein said second burner tube is fluidly connected to said second end of said second fuel supply spoke;
a plurality of side spoke holes located on the left and right surfaces of said first fuel supply spoke;
a plurality of side spoke holes located on the left and right surfaces of said second fuel supply spoke;
a plurality of top side burner holes located on the top surfaces of said first burner tube;
a plurality of top side burner holes located on the top surfaces of said second burner tube;
a plurality of side burner holes located on the left and right surfaces of said first burner tube; and
a plurality of side burner holes located on the left and right surfaces of said second burner tube.

13. The fire pit burner of claim 12, wherein said first and second ends of said first burner tube are each mechanically sealed.

14. The fire pit burner of claim 12, wherein said first and second ends of said second burner tube are each mechanically sealed.

15. The fire pit burner of claim 12, further comprising a plurality of top side spoke holes located on the top surface of said first fuel supply spoke.

16. The fire pit burner of claim 12, further comprising a plurality of top side spoke holes located on the top surface of said second fuel supply spoke.

17. The fire pit burner of claim 12, wherein said inlet hub further comprises an internally threaded opening.

18. The fire pit burner of claim 12, wherein said first ends of said first fuel supply spoke and said second fuel supply spoke are welded to said inlet hub.

19. The fire pit burner of claim 12, wherein said side spoke holes are substantially perpendicular to said top side spoke holes.

20. The fire pit burner of claim 12, wherein said side burner holes are substantially perpendicular to said top side burner holes.

21. The fire pit burner of claim 12, wherein said second end of said first fuel supply spoke is welded to said first burner tube, and wherein said second end of said second fuel supply spoke is welded to said second burner tube.

22. The fire pit burner of claim 12, wherein said first end and said second end of said first burner tube each are no more than five inches from said first fuel supply spoke, and wherein said first end and said second end of said second burner tube each are no more than five inches from said second fuel supply spoke.

23. The fire pit burner of claim 12, wherein said inlet hub, said first fuel supply spoke, said second fuel supply spoke, said first burner tube, and said second burner tube are made of stainless steel.

24. The fire pit burner of claim 12, wherein said first end and said second end of said first burner tube are each above the elevation of where said first burner tube is fluidly connected to said first fuel supply spoke, and wherein said first end and said second end of said second burner tube are each above the elevation of where said second burner tube is fluidly connected to said second fuel supply spoke.

25. The fire pit burner of claim 12, wherein said first burner tube further comprises a curved portion, and second burner tube further comprises a curved portion.

26. The fire pit burner of claim 25, wherein said first burner tube further comprises a second curved portion, and second burner tube further comprises a second curved portion.

27. The fire pit burner of claim 26, wherein the radius of said second curved portion of said first burner tube is greater than the radius of said curved portion of said first burner tube, and wherein the radius of said second curved portion of said second burner tube is greater than the radius of said curved portion of said second burner tube.

28. The fire pit burner of claim 12, wherein said first end and said second end of said first burner tube each are no more than five inches from said first fuel supply spoke, and wherein said first end and said second end of said second burner tube each are no more than five inches from said second fuel supply spoke.

29. The fire pit burner of claim 12, wherein said first burner tube is mechanically, but not fluidly, connected to said second burner tube.

30. The fire pit burner of claim 12, wherein said first burner tube is fluidly, connected to said second burner tube.

* * * * *